(12) United States Patent
Fujiwara et al.

(10) Patent No.: US 6,290,398 B1
(45) Date of Patent: Sep. 18, 2001

(54) ROLLING BEARING

(75) Inventors: Hideki Fujiwara; Haruo Kimura, both of Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/381,306

(22) PCT Filed: Apr. 2, 1998

(86) PCT No.: PCT/JP98/01563

§ 371 Date: Sep. 17, 1999

§ 102(e) Date: Sep. 17, 1999

(87) PCT Pub. No.: WO98/44270

PCT Pub. Date: Oct. 8, 1998

(30) Foreign Application Priority Data

Apr. 3, 1997 (JP) ................................................ 9-084941
Nov. 20, 1997 (JP) ................................................ 9-319489

(51) Int. Cl.$^7$ ................................................ F16C 33/62
(52) U.S. Cl. ............................................ 384/625; 384/492
(58) Field of Search ..................................... 384/492, 625

(56) References Cited

U.S. PATENT DOCUMENTS 4,981,284 * 1/1991 Imamura et al. ................. 384/492 X
5,507,580   4/1996 Dezanni et al. ..................... 384/492
5,833,373 * 11/1998 Ueno et al. ......................... 384/527

FOREIGN PATENT DOCUMENTS

19500576A1   9/1995 (DE) .
0511409A1   11/1992 (EP) .
1266970     3/1972 (GB) .
5-96486U    12/1993 (JP) .
6-81848A     3/1994 (JP) .
6-341442A   12/1994 (JP) .

* cited by examiner

*Primary Examiner*—Thomas R. Hannon
(74) *Attorney, Agent, or Firm*—Birch, Stewart, Kolasch & Birch, LLP

(57) ABSTRACT

At least one of constituent elements of a rolling bearing is formed of a metallic material which contains an alloy element having a strong affinity for nitrogen while being of low grade in terms of cost and characteristics, and has a nitriding layer formed on surfaces thereof to be hardened. Accordingly, it is possible to use such rolling bearing as a substitute for conventional rolling bearings or rolling bearings of high grade which are known as general rolling bearings.

17 Claims, 4 Drawing Sheets

6 Nitrided layer

2(3,4) Metallic material

ROLLING BEARING

This application is the national phase under 35 U.S.C. § 371 of PCT International Application No. PCT/JP98/01563 which has an International filing date of Apr. 2, 1998, which designated the United States of America.

1. Technical Field of the Invention

This invention relates to a ball-and-roller bearing. More particularly, it is a bearing which is suitable for use with those parts of which a high level of lubrication is required, including the crank journal of a two-cycle, or kerosene engine, a ship, the cylinder head of a four-cycle engine, a supercharger such as a turbocharger, and the actuator for the hydraulic control of a hydraulic suspension. It can, of course, be used for supporting various other rotating parts, too.

2. Background of the Related Art

A common ball-and-roller bearing has surfaces hardened by heat treatment on e.g. the tracks of its inner and outer races and its balls. The inner and outer races and balls are usually made of a bearing steel designated as SUJ by JIS, hardened by lowering their temperature from the range of 900–930° C. to an appropriate level, and tempered at a temperature of 160–180° C. depending on the temperature prevailing in the environment in which the bearing will be used.

The hardening treatment for a ball-and-roller bearing as stated above is, however, likely to bring about a large amount of strain and thereby a large dimensional variation due to the transformation of its structure from martensite to austenite and a large temperature variation. The dimensional variation calls for the grinding and ultrafinish treatment of the parts as heat treated, and these additional steps add to the cost of bearing manufacture. It is impossible to employ a very high tempering temperature, since it is necessary to keep the amount of residual austenite at an appropriate level to prevent any dimensional change, or hardness reduction at the temperature prevailing in the environment in which the bearing is used, and it is, therefore, conventions usual to use a ball-and-roller bearing only at a temperature up to about 170° C.

A high temperature bearing steel, such as M50 according to AISI or SKH4 according to JIS, gives a ball-and-roller bearing of higher grade which can withstand use at a temperature up to about 400° C., but as it is considerably more expensive than SUJ according to JIS, the bearing is so expensive that its use is limited to a special case.

There is also known a bearing having surfaces covered with hard chromium coating, but their coating is likely to peel easily off the track surfaces of the races.

It is, therefore, an object of this invention to provide a ball-and-roller bearing which is less expensive than any known product and yet can withstand use at a temperature at which it has hitherto been possible to use only a product made of a material of higher grade.

DISCLOSURE OF THE INVENTION

[Structural Features]

(1) A ball-and-roller bearing according to a first aspect of this invention has at least one of its members made of a metallic material containing an alloying element having a high affinity for nitrogen, and having a nitrided layer on its surface free from any oxide.

(2) According to a second aspect of this invention, the metallic material as stated at (1) above is a carburizing or nitriding steel.

(3) According to a third aspect of this invention, the metallic material as stated at (1) above is a stainless steel.

(4) According to a fourth aspect of this invention, the nitrided layer as stated at (1) above includes a compound layer formed as a film on the surface and a diffusion layer formed from nitrogen diffused under the compound layer.

(5) According to a fifth aspect of this invention, an oxide film is formed on the nitrided layer.

[Functions]

According to an essential feature of this invention, a nitrided layer is formed on the surface of a metallic material which is generally considered as being of low grade, after oxide has been removed from its surface, so that even such a material may have a hardened surface and be useful as a substitute for a common material for the known ball-and-roller bearing (hardened bearing steel of the SUJ series according to JIS), or a material of higher grade (high-temperature bearing steel, such as M50 according to AISI or SKH4 according to JIS). Examples of the metallic material on which the nitrided layer is formed, or the metallic material containing an alloying element having a high affinity for nitrogen are carburizing steel (e.g. of the SCM series according to JIS), nitriding steel (e.g. of the SACM series according to JIS) and stainless steel (e.g. of the SUS series according to JIS).

The nitrided layer formed on the surface of carburizing or nitriding steel after the removal of oxide therefrom gives it a surface hardness which is comparable to that of a common material (bearing steel of the SUJ series according to JIS as hardened by heat treatment), and the nitrided layer formed on the surface of stainless steel after the removal of oxide therefrom gives it a surface hardness which is comparable to that of a material of ultrahigh grade (e.g. a sintered ceramic material consisting mainly of silicon nitride).

Moreover, as the nitrided layer is formed on the surface of the metallic material not directly, but after oxide has been removed therefrom, nitrogen undergoes a higher rate of diffusion, and the nitrided layer is formed at a lower temperature in a shorter time, so that the thermal straining of the material is less likely to occur. As a result, it is possible to omit any after-treatment, such as grinding, that has been required of the known product of a common material, and it is, therefore, possible to achieve a reduction of manufacturing cost. The nitrided layer can be formed at a still lower temperature in a still shorter time on the metallic material containing an alloying element having a high affinity for nitrogen.

Thus, this invention makes it possible to give an inexpensive metallic material of low grade the hardness which is comparable to that of any known material of common or high grade, and accomplish its hardening treatment by a simpler process, and thereby at a lower cost.

The oxide formed on the nitrided layer on a bearing according to the fifth aspect of this invention gives its surface a still higher level of corrosion resistance.

[Advantages]

According to this invention, any of the members of a ball-and-roller bearing is made of a metallic material of low cost and grade instead of any known material of common or high grade, and a nitrided layer is formed on its surface after the removal of oxide therefrom, and gives it a higher level of properties which is comparable to that of any known material of common or high grade. As a result, the bearing is inexpensive, and yet has excellent properties, including wear, heat and corrosion resistances, which make it suitable for use under harsh conditions.

The removal of oxide from the surface of the metallic material enables nitrogen to undergo a high rate of diffusion to form the nitrided layer. Therefore, the nitrided layer can be formed at a low temperature in a short time to a relatively large depth as compared with what can be formed on any known material of common grade, and while the thermal straining of the material is less likely to occur, the nitrided layer is of high density and smoothness, and does not require any grinding, or other after-treatment that has hitherto been necessary, but enables the bearing to be manufactured at a lower cost.

The oxide formed on the nitrided layer on a bearing according to the fifth aspect of this invention gives it a still higher degree of corrosion resistance and makes it suitable for use in a corrosive environment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE INVENTION

The present invention will become more fully understood from the detailed description given hereinbelow and the accompanying drawings which are given by way of illustration only, and thus are not limitative of the present invention, and wherein.

BEST MODE OF CARRYING OUT THE INVENTION

Description will now be made in detail of this invention based on the best modes of carrying it out as shown in the accompanying drawings.

Figure 1:
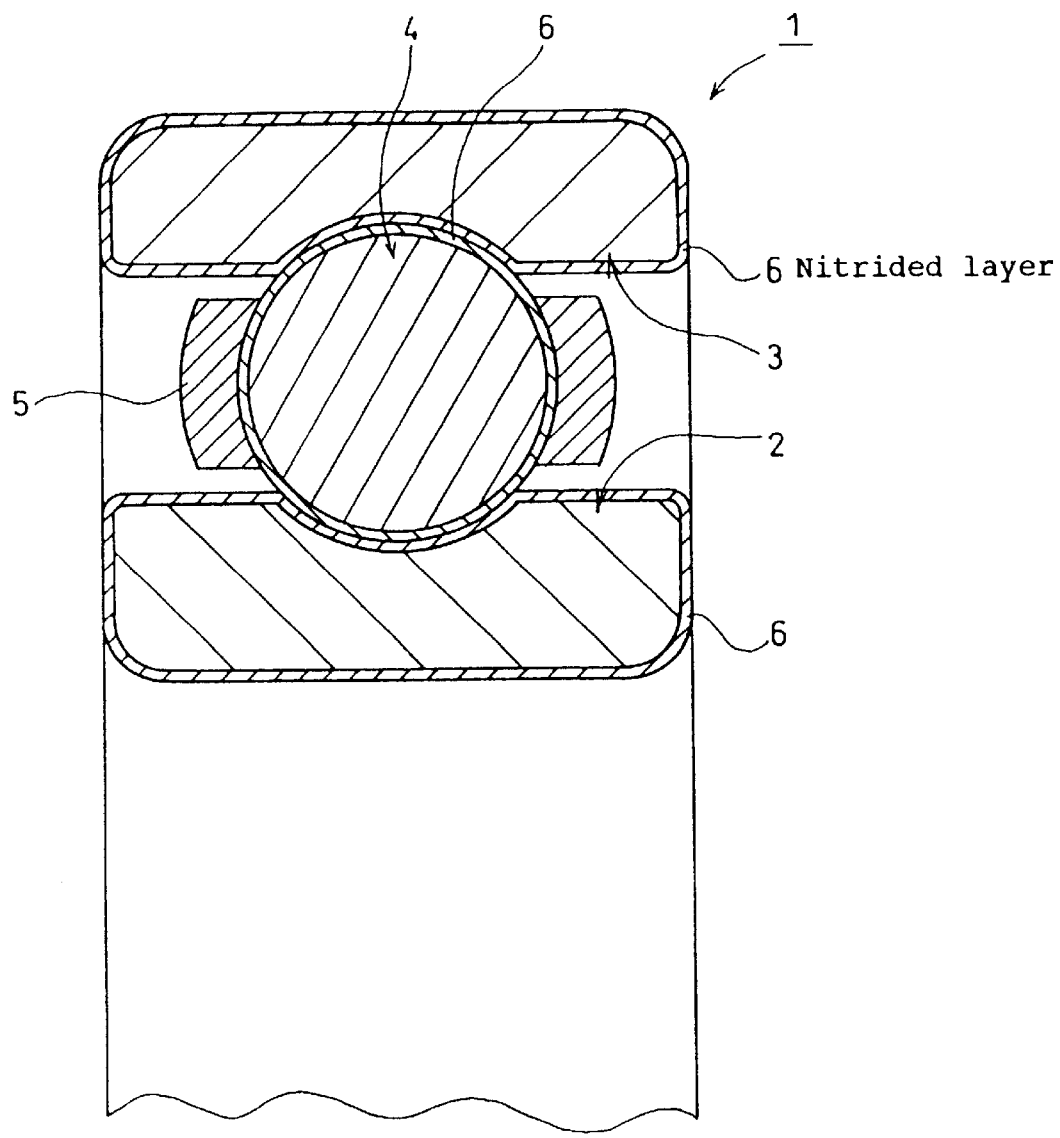
FIG. 1 is a cross sectional view of the upper half of a ball-and-roller bearing embodying this invention.
Figure 2:
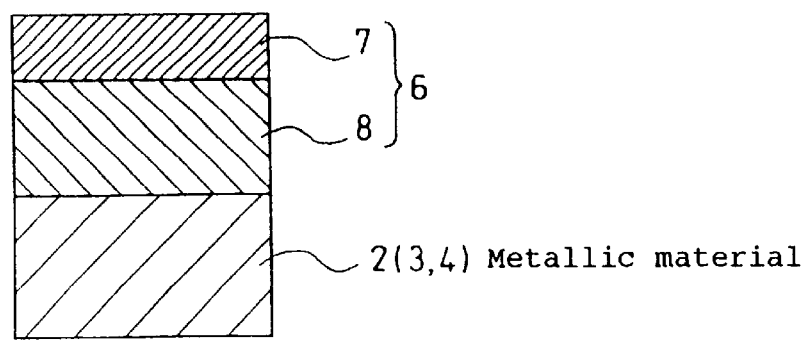
FIG. 2 is an enlarged sectional view of its nitrided layer.
Figure 3:
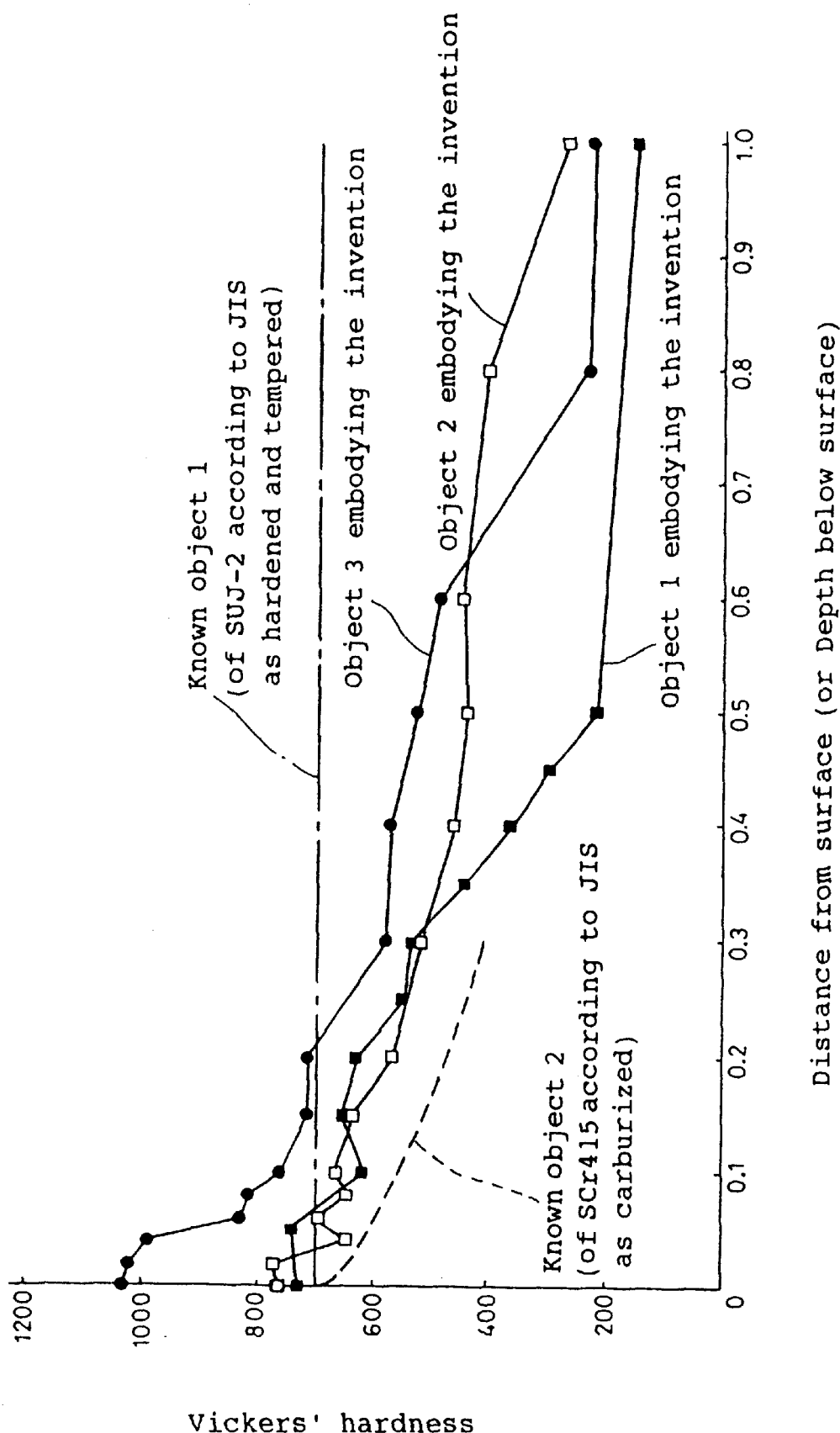
FIG. 3 is a graph showing the hardness of metallic materials having nitrided layers formed thereon in relation to the depth below their surfaces.

FIGS. 1 to 3 show a mode of carrying out this invention. Aball-and-roller bearing as a whole is shown at 1. The bearing 1 has an inner race 2, an outer race 3, a plurality of spherical rolling bodies, or balls 4, and a holder 5.

The outer surface of the inner race 2 and the inner surface of the outer race 3 have track grooves (not numerically shown) formed as tracks for the balls 4. The holder 5 is a corrugated one composed of two corrugated annular plates put together coaxially with each other.

A nitrided layer 6 is formed on the surface of each of the inner and outer races 2 and 3 and the balls 4. The inner and outer races 2 and 3 and the balls 4 on which the nitrided layer 6 is to be found are made of a metallic material containing an alloying element having a high affinity for nitrogen, such as carburizing steel (e.g. of the SCM series according to JIS), nitriding steel (e.g. of the SACM series according to JIS), or stainless steel (e.g. of the SUS series according to JIS).

Description will now be made of a process for forming the nitrided layer 6 on certain members of the bearing 1 (i.e. the inner and outer races 2 and 3 and the balls 4).

Preparation is first made of the objects on which the nitrided layer 6 is to be formed. The objects are made of carburizing, nitriding or stainless steel as stated above. If the objects are the inner and outer races 2 and 3, it is understood that each object has a properly finished outward shape obtained by forging, turning, green grinding, roll forming, etc. If the objects are the balls 4, it is also understood that each has a properly finished outward shape.

The objects as prepared have their surfaces cleaned prior to the formation of the nitrided layer 6 thereon. Their cleaning is carried out by holding the objects at an appropriate temperature $T_1$ (e.g. from 300° C. to 400° C.) for an appropriate length of time (e.g. from 10 to 120 minutes) in a mixed gas containing nitrogen trifluoride ($NF_3$), nitrogen, etc. As a result, the surfaces of the objects are cleaned by the removal of oxide, etc. therefrom, and a metal fluoride film is formed thereon. The metal fluoride film is a passive one which prevents the adsorption of oxygen to the surfaces or their oxidation, and thereby inhibits the formation of any oxide thereon until their nitriding treatment. A preferred fluoriding gas is an inert gas, such as $N_2$, containing $NF_3$, $BF_3$, $CF_4$, HF, $SF_6$, or $F_2$, or a mixture thereof as a source of fluorine supply. $NF_3$ is, among others, preferred for practical use from the standpoints of safety, reactivity, controllability, ease of handling, etc. An effective fluorine-containing gas contains from 0.05 to 20%, and preferably from 3 to 5%, by weight of $NF_3$ or other source of fluorine supply.

Then, nitriding treatment is carried out. The objects as subjected to fluoriding treatment are held at an appropriate temperature $T_2$ (e.g. from 480° C. to 700° C.) for an appropriate length of time (e.g. from 0.5 to 5 hours) in an appropriate reactive gas, such as a gas of $NH_3$, or a mixture of $NH_3$ and a source of carbon supply (e.g. an RX gas). As a result, a nitrided layer 6 is formed. During the nitriding treatment, it is easy for nitrogen to undergo penetration and diffusion rapidly and deeply into the metallic material of the object to be treated, since the metal fluoride film on its surface becomes an active one as a result of the rise in temperature from $T_1$ as employed for the fluoriding treatment to $T_2$ for the nitriding treatment, and since the metallic material contains an alloying element, such as carburizing, nitriding or stainless steel or the like, having a high affinity for nitrogen. Then, the objects are cooled at an appropriate rate. They are held in nitrogen gas until they are cooled, so that no oxide may be formed on their surfaces.

The nitrided layer 6 as formed comprises an ultrahard compound layer 7 containing nitrides, such as CrN, $Fe_2N$, $Fe_3N$ and $Fe_4N$, from the steel surface of the object to its interior, and a diffusion layer 8 contiguous to it and containing nitrogen atoms.

Although the nitrided layer 6 may have a depth of, say, 1 mm if the nitriding treatment is continued for a longer time, it is often the case that the maximum shearing stress acting on the track surfaces of a bearing reaches only a depth of 0.01 to 0.08 mm, and it is, therefore, sufficient for the nitrided layer 6 to have at least eight times as large a depth to ensure the life of the bearing, while its depth can be altered by selecting the nitriding temperature $T_2$ and time appropriately. The temperature $T_2$ may be lower than what is usually employed, since the nitriding treatment is preceded by the fluoriding treatment. The lower temperature ensures that the thermal straining of the metallic material be restrained. The nitrided layer 6 has a surface roughness which is substantially equal to that of the object to be treated. The examination of a section of the nitrided layer 6 through an electron microscope (Olympus PMG3 of 400 magnifications) confirmed its high density and smoothness with an average particle diameter not exceeding one micron.

As no dimensional variation caused by thermal strain occurs to the object during the formation of the nitrided layer 6, there is no longer any necessity for grinding its surface thereafter. Therefore, the manufacture of, for example, the inner and outer races 2 and 3 of the bearing 1 calls for only the step of forming their outward shape (forging, turning, green grinding and roll forming), the step of forming the nitrided layer 6 (fluoriding and nitriding treatment) and the step of ultrafinishing the products. While it has hitherto been necessary to carry out the step of forming their outward shape (forging, turning, green grinding and roll forming), the step of heat treatment (hardening and tempering), the grinding step and the ultrafinishing step, this invention does not require the grinding step, but enables a corresponding reduction in the cost of manufacture.

Reference is now made to FIG. 3 showing the surface hardness achieved by the nitrided layer 6 formed as described above on carburizing or nitriding steel.

In the graph, an object 1 embodying this invention was prepared by using SCM415, a carburizing steel according to JIS, as a metallic material and subjecting it to nitriding treatment at 570° C. for 12 hours after fluoriding, an object 2 embodying this invention was prepared by using SCM435, a carburizing steel according to JIS, as a metallic material and subjecting it to nitriding treatment at 570° C. for 48 hours after fluoriding, and an object 3 embodying this invention was prepared by using SACM645, a nitriding steel according to JIS, as a metallic material and subjecting it to nitriding treatment at 570° C. for 48 hours after fluoriding, while a known object 1 was prepared by using SUJ-2, a bearing steel according to JIS, as a metallic material and hardening and tempering it and a known object 2 was prepared by using SCr415, a bearing steel according to JIS, as a metallic material and carburizing it. As a result, the object 1 embodying this invention showed a Vickers' hardness, Hv, of 731 (as measured under a load of 50 gf) on its surface, the object 2 embodying this invention showed a Vickers' hardness, Hv, of 763 (as measured under a load of 50 gf) on its surface, and the object 2 embodying this invention showed a Vickers' hardness, Hv, of 1,036 (as measured under a load of 50 gf) on its surface, and the objects 1 and 2 embodying this invention were comparable to the known objects 1 and 2 in surface hardness, while the object 3 embodying this invention was by far higher. The levels of hardness as determined of the objects 1 to 3 embodying this invention confirm that they are satisfactory as substitutes for any known product of a material of common grade (bearing steel of the SUJ series according to JIS as hardened by heat treatment), or any known product of a material of high grade (high-temperature bearing steel, such as M50 according to AISI, or SKH4 according to JIS).

The nitrided layer 6 can alternatively be formed by tufftriding, or gas soft nitriding treatment not preceded by fluoriding if carburizing or nitriding steel is used as the metallic material. This alternative treatment, however, gives a layer which is inferior in surface smoothness to what is formed after fluoriding. More specifically, the nitrided layer 6 embodying this invention showed a friction factor of 0.24 which was less than a half of a friction factor of 0.54 shown by a nitrided layer formed by tufftriding not preceded by fluoriding, when their friction factors were both measured under no lubrication. The tests were conducted by using a HRIDON wear tester, reciprocating a ball (made of SUJ2) under a load of 200 gf on each testpiece (made of SCM415 and having a nitrided layer 6 formed on its surface) at a speed of 100 mm per second along a distance of 20 mm and repeating it 10 times to measure the dynamic friction factors of the testpiece, whereafter the average maximum of the measured values was calculated. As regards the hardness, the nitrided layer 6 embodying this invention and the nitrided layer 6 formed by tufftriding not preceded by fluoriding were both comparable to any known product of a material of common grade, as they showed a Vickers, hardness, Hv, of 450 to 1,000 (under a load of 50 gf).

Figure 4:
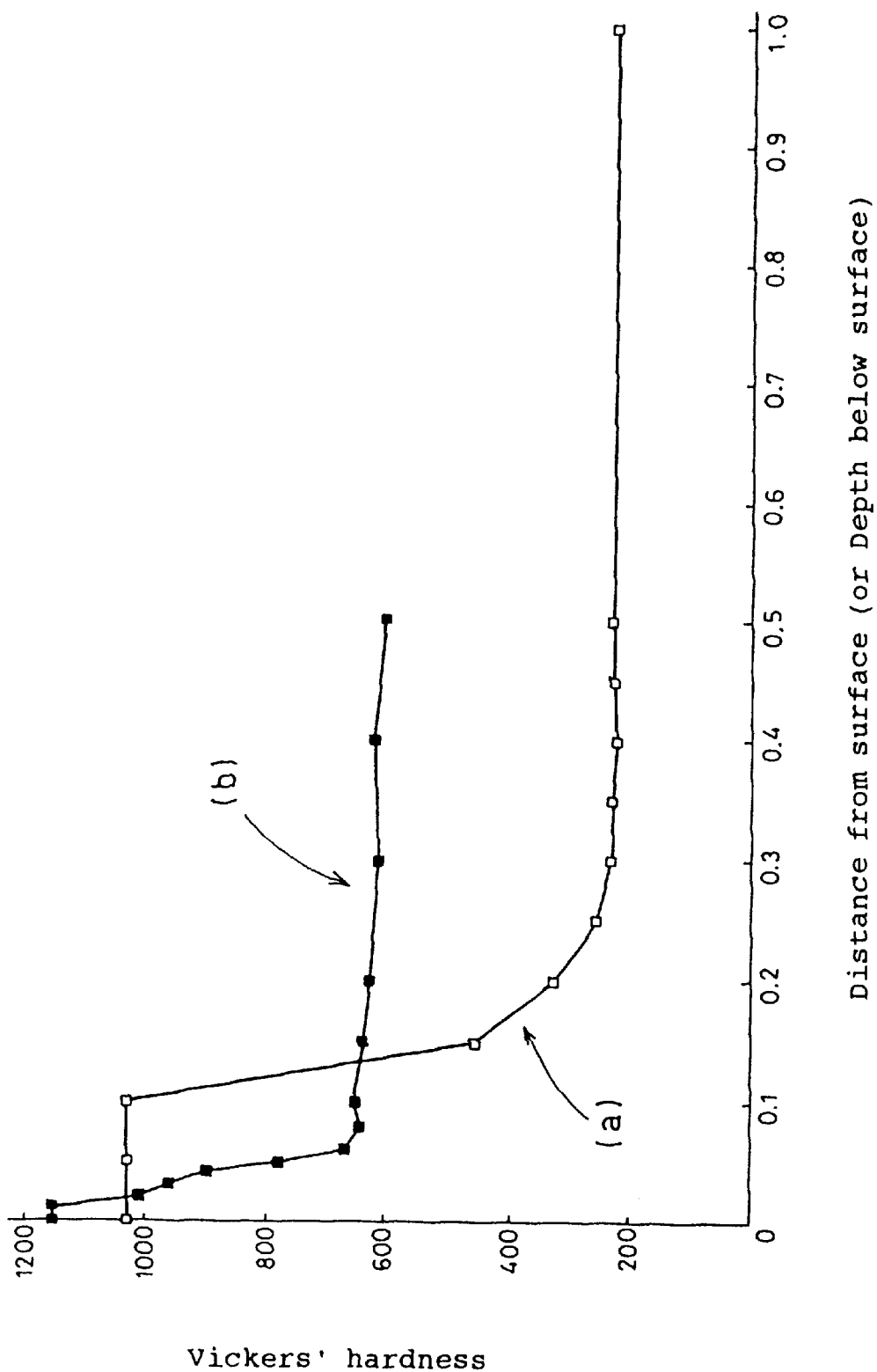
FIG. 4 is a graph similar to FIG. 3, but showing the hardness of stainless steel as a metallic material.

Description will now be made of the case in which stainless steel (e.g. of the SUS series according to JIS) is used as the metallic material. In order to form a nitrided layer 6 on stainless steel, it is usually necessary to carry out its fluoriding treatment before nitriding, since the oxide existing on its surface prevents the formation of a nitrided layer 6 by tufftriding, or gas soft nitriding treatment alone. A nitrided layer 6 formed on an inner or outer race 2 or 3 of SUS440C according to JIS by 12 hours of nitriding treatment at 570° C. after fluoriding as described before showed a Vickers hardness, Hv, of 1,031 (under a load of 50 gf), as shown at (a) in FIG. 4. This level of hardness makes any such object suitable as a far less expensive substitute for any product of a material of ultrahigh grade (a sintered ceramic material consisting mainly of silicon nitride).

The hardening treatment of stainless steel as the metallic material prior to its nitriding makes it possible to form a nitrided layer 6 having a still higher level of hardness on its surface and in its interior. It is, however, necessary to grind the surface of the material before forming the nitrided layer 6, since its surface is unavoidably strained by such hardening treatment. A nitrided layer 6 formed on an inner or outer race 2 or 3 of SUS440C according to JIS by three hours of nitriding treatment at 500° C. after quenching and tempering showed a Vickers' hardness, Hv, of 1,156 on its surface and a Vickers' hardness, Hv, of 600 or above in its interior (both under a load of 50 gf), as shown at (b) in FIG. 5. Although the nitrided layer 6 shown at (b) had a small depth because of the nitriding time of as short as three hours, its depth, and particularly the depth of its diffusion layer 8 can be increased by a longer time of nitriding treatment. Although the hardening and grinding of the material prior to the formation of the nitrided layer 6 may unavoidably result in a higher cost of manufacture, the product is still a far less expensive substitute for any product of a material of ultrahigh grade (a sintered ceramic material consisting mainly of silicon nitride).

The members of the bearing embodying this invention as described above have improved properties, including wear, heat and corrosion resistances, owing to the nitrided layer 6 of high density and smoothness imparting an improved surface hardness to the metallic material. These members can withstand a high ambient temperature without having any reduction in hardness, or any dimensional variation, and are comparable to any product of a material of high grade (a high-temperature bearing steel, such as M50 according to AISI or SKH4 according to JIS), and make the bearing 1 suitable for use in an environment having a high temperature. Moreover, the bearing can be manufactured at a low cost from an inexpensive metallic material of low grade. As no thermal strain occurs even if the nitrided layer 6 may be so formed as to have a depth at which the maximum shearing stress acts upon the bearing 1, a further reduction is possible in the cost of its manufacture, since no grinding is necessary after the formation of the nitrided layer. Thus, the bearing according to this invention is inexpensive as compared with any known product of a common material (a bearing steel of the SUJ series according to JIS as hardened by heat treatment), and yet is as useful as any known product of a material of high grade (a high-temperature bearing steel, such as M50 according to AISI, or SKH4 according to JIS), or any product of a material of ultrahigh grade (a sintered ceramic material consisting mainly of silicon nitride).

Figure 5:
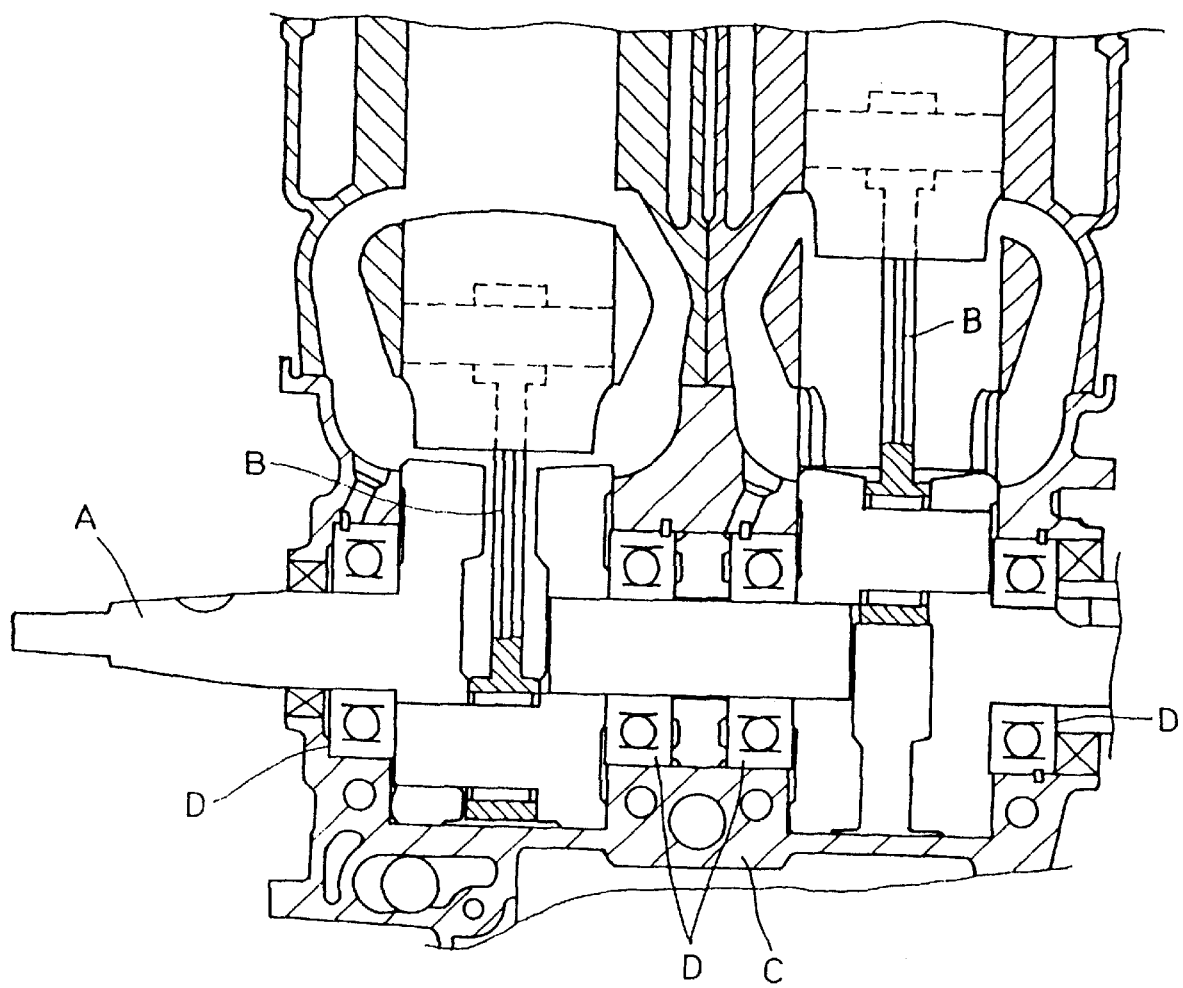
FIG. 5 is a fragmentary sectional view showing by way of example the application of the bearing according to this invention.

Although this invention has been described by way of a preferred form embodying it, modifications or variations will be possible, including the following:

(1) The ball-and-roller bearing 1 embodying this invention is suitable for use with various parts of which a high level of lubrication is required, including the crank journal of a two-cycle, or kerosene engine, a part of a ship, the cylinder head of a four-cycle engine, a supercharger such as a turbocharger, and the actuator for the hydraulic control of a hydraulic suspension. It can, of course, be used to support various other rotating parts, too. Referring specifically to a two-cycle engine, the bearing 1 can be used as each of bearings D supporting a crankshaft A at the ends of connecting rods B on a casing C, as shown in FIG. 5. If a nitrided layer 6 is formed on each member of the bearing 1 except the holder 5, the holder 5 may be made of a sheet of carbon steel, such as SPCC, or stainless steel, such as SUS304 according to JIS.

(2) Although the invention has been described by way of a deep groove type ball bearing, it is also applicable to various other types of bearings, such as cylindrical, conical, spherical and needle roller bearings. Moreover, this invention is also applicable to any bearing of the type having races formed as a part of e.g. a rotating shaft, or housing.

(3) Although the nitrided layer 6 has been described as being formed on each of the inner and outer races 2 and 3, and the balls 4, this invention covers any bearing having a nitrided layer 6 formed on at least one of its members (inner or outer race 2 or 3, balls 4, or holder 5). If a nitrided layer 6 is formed on the inner or outer race 2 or 3, it does not have to be formed on the whole surface thereof, but has to be formed on at least the track surface thereof. The member or members of any bearing on which no nitrided layer 6 is formed can be prepared from any of various kinds of materials including ceramics and bearing steels, depending on the use for which the bearing is intended, so that it may be of the composite construction formed by a combination of different materials.

(4) An oxide layer can be formed over the nitrided layer 6, though not shown. It gives the bearing a still higher level of corrosion resistance and makes it capable of withstanding use in a vacuum, or corrosive environment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ball-and-roller bearing comprising:
   (a) an inner race having an outer surface;
   (b) an outer race having an outer surface;
   (c) a plurality of rolling bodies each having an outer surface; and
   (d) a holder, at least one of said inner race, outer race, and said plurality of rolling bodies is made of a metallic material containing an alloying element having a high affinity for nitrogen, wherein said at least one of said inner race, outer race, and said plurality of rolling bodies has a nitrided layer having a high density and a high smoothness formed on each of their respective outer surfaces without any intermediate oxide film between said outer surfaces and said nitrided layer, said nitrided layer having an average particle diameter less than or equal to one micron, and
   said metallic material is carburizing steel, stainless steel, or nitriding steel.

2. The ball-and-roller bearing according to claim 1, wherein said metallic material is stainless steel.

3. The ball-and-roller bearing according to claim 1, wherein said nitrided layer comprises a compound layer formed as a film on said respective outer surface and a diffusion layer including nitrogen diffused beneath said compound layer.

4. The ball-and-roller bearing according to claim 1, wherein said inner race is made of said metallic material.

5. The ball-and-roller bearing according to claim 4, wherein said plurality of rolling bodies and said outer race is made of said metallic material.

6. The ball-and-roller bearing according to claim 1, wherein said outer race is made of said metallic material.

7. The ball-and-roller bearing according to claim 1, wherein said plurality of rolling bodies is made of said metallic material.

8. The ball and roller bearing according to claim 1, wherein the nitrided layer has a depth of at least 0.64 mm, and the depth does not exceed 1.00 mm.

9. A method of manufacturing the ball and roller bearing as claimed in claim 1, the method comprising the steps of:
   finishing an outer surface of at least one of said inner race, outer race, and said plurality of rolling bodies made of the metallic material prior to a formation of the nitrided layer by forging, turning, green grinding or roll forming the metallic material;
   cleaning the metallic material in a mixed fluoriding gas to form a metal fluoride film; and
   forming the nitrided layer on the metallic material with a nitriding treatment process.

10. The method according to claim 9, wherein the cleaning of the metallic material includes the additional steps of:
    holding the metallic material for approximately 10 to 120 minutes in a high temperature environment having a cleaning temperature of approximately 300° C. to 400° C.; and
    exposing the metallic material in the high temperature environment to the fluoriding gas.

11. The method according to claim 10, wherein the fluoriding gas is selected from the group of $N_2$, $NF_3$, $BF_3$, $CF_4$, HF, $SF_6$, and $F_2$.

12. A ball-and-roller bearing comprising:
    (a) an inner race having an outer surface;
    (b) an outer race having an outer surface;
    (c) a plurality of rolling bodies each having an outer surface; and
    (d) a holder, at least one of said inner race, outer race, and said plurality of rolling bodies is made of a metallic material containing an alloying element having a high affinity for nitrogen, wherein said at least one of said inner race, outer race, and said plurality of rolling bodies each has a nitrided layer having a high density and a high smoothness formed between each of said respective outer surfaces and an oxide film, said nitrided layer having an average particle diameter less than or equal to one micron, and
    said metallic material is carburizing steel, stainless steel, or nitriding steel.

13. The ball-and-roller bearing according to claim 12, wherein said nitrided layer comprises a compound layer comprised of nitrogen diffused below said compound layer.

14. The ball-and-roller bearing according to claim 13, wherein said inner race is made of said metallic material.

15. The ball-and-roller bearing according to claim 14, wherein said plurality of rolling bodies and said outer race are made of said metallic material.

16. The ball-and-roller bearing according to claim 13, wherein said outer race is made of said metallic material.

17. The ball-and-roller bearing according to claim 13, wherein said plurality of rolling bodies is made of said metallic material.

* * * * *